R. R. BENNETT 2,926,852

ELECTRONIC RESOLVER

Filed May 1, 1956

ROBERT R. BENNETT
INVENTOR

ATTORNEY

March 1, 1960  R. R. BENNETT  2,926,852
ELECTRONIC RESOLVER
Filed May 1, 1956  6 Sheets-Sheet 5

INVENTOR.
ROBERT R. BENNETT,
BY
ATTORNEY.

March 1, 1960  R. R. BENNETT  2,926,852
ELECTRONIC RESOLVER

Filed May 1, 1956  6 Sheets-Sheet 6

INVENTOR.
ROBERT R. BENNETT,
BY
ATTORNEY.

United States Patent Office 2,926,852
Patented Mar. 1, 1960

2,926,852

ELECTRONIC RESOLVER

Robert R. Bennett, Los Angeles, Calif., assignor to Hughes Aircraft Company, Culver City, Calif., a corporation of Delaware Application May 1, 1956, Serial No. 582,622

7 Claims. (Cl. 235—189)

This invention relates to analogue computers and, more particularly, to an electronic resolver adapted to receive an applied direct-current signal and to produce a direct-current output signal representative of the product of the applied direct-current signal and a function of the phase angle of an input sine wave signal with respect to a reference sine wave signal.

In electric analogue computing systems it is often necessary to provide a trigonometric resolution of certain received input sigals. In alternating-current computing circuits, electromagnetic resolvers are commonly used for the generation of sine and cosine functions. A typical electromagnetic resolver consists of a rotor and stator, each wound with two separate coils situated precisely at right angles to each other.

If alternating-current voltages representing X and Y are impressed on two stator windings, the resultant magnetic field is at an angle $$\tan^{-1}\frac{Y}{X}$$

from the X axis and the rotor may then be oriented perpendicular to the magnetic field by means of a servomechanism.

A similar operation is possible with direct-current voltages representing X and Y. In this case it is well known to use a pickup element on the rotor to indicate the orientation in a steady state magnetic field. The pickup element is usually excited by an alternating-current carrier and has two output coils connected in series opposition. The output signal difference may then be fed to a phase detector which produces direct-current error signal for the associated servo amplifier.

Potentiometer circuits are also well known which will provide a voltage closely approximating the tangent function.

In all of the above schemes for obtaining a trigonometric resolution of input signals, some electromechanical apparatus is necessary such as potentiometers and servo motors. The device of the present invention, on the other hand, requires no mechanical parts or apparatus such as potentiometers or servo motors. Its method of operation depends entirely upon electronic circuit elements. Further, the speed, reliability, and accuracy achieved by an all electronic system such as is the subject of the present invention is considerably greater than that obtainable from the above-mentioned resolvers.

It is, therefore, an object of the present invention to provide a direct-current resolver which has a greater reliability than heretofore obtainable.

A further object of the present invention is to provide a direct-current resolver whose response time is of exceedingly short duration.

A still further object of the present invention is to provide an improved direct-current electronic resolver which requires no mechanical parts.

In accordance with the present invention, there is provided an entirely electronic system for receiving two or more direct-current input signals and producing one or more direct-current output signals representative of a trigonometric function of the input signals.

According to one embodiment of the invention, two direct-current input signals, one representing a voltage Z and the other a voltage $\theta$, are electronically resolved into two output direct-current signals, one representing $Z \sin \theta$, and the other $Z \cos \theta$.

According to a second embodiment of the present invention, an all electronic trigonometric resolution of three direct-current input signals representing X, Y, and W into three direct-current output signals $(X^2+Y^2)^{\frac{1}{2}}$, $W \sin \theta$, and $W \cos \theta$, where $\theta$ is equal to $$\tan^{-1}\frac{Y}{X}$$

is achieved.

The novel features which are believed to be characteristic of the invention, both as to its organization and method of operation, together with further objects and advantages thereof, will be better understood from the following description considered in connection with the accompanying drawings, in which the invention is illustrated by way of example. It is to be expressly understood, however, that the drawings are for the purposes of illustration and description only, and are not intended as a definition of the limits of the invention.

Figure 1:
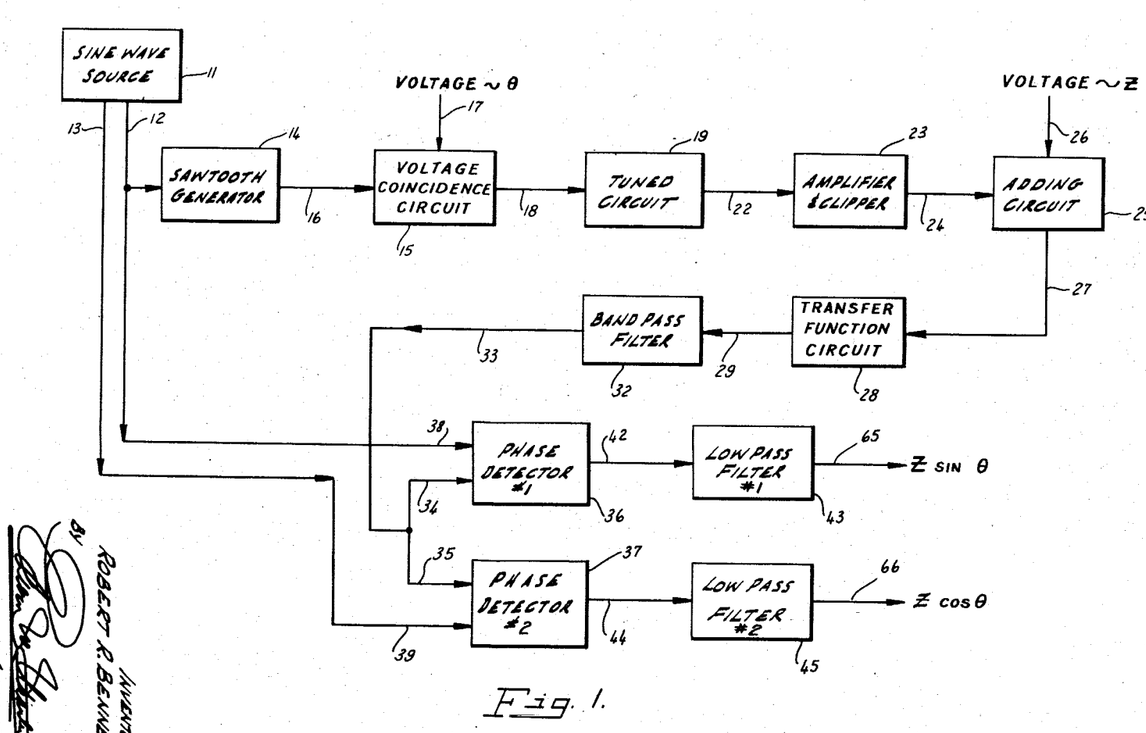
Fig. 1 is a block diagram of one embodiment of the present invention.

Referring now to the drawings wherein like reference characters represent like parts throughout the various views, there is shown in Fig. 1 one embodiment of the apparatus of the present invention. Sine wave source 11 produces at its two output leads 12 and 13, two sine wave output signals. The signal appearing at output lead 12 is at zero phase, while that appearing at lead 13 is 90° out-of-phase with the former. Saw tooth generator 14 is coupled through output lead 12 to sine wave source 11. The saw tooth wave signal produced by saw tooth generator 14 is applied to one of the input circuits of voltage coincidence circuit 15 through input lead 16. A second input lead or circuit 17 of voltage coincidence circuit 15 receives a direct-current input voltage which is proportional or equal to $\theta$. Voltage coincidence circuit 15 has its output circuit 18 coupled to tune circuit 19 which, in turn, has its output circuit 22 coupled to the input of amplifier and clipper circuit 23. The output of amplifier and clipper circuit 23 is coupled to one of the input circuits 24 of adding circuit 25, the other input circuit 26 being coupled to a direct-current source which produces a voltage proportional or equal to Z. The output circuit 27 of adding circuit 25 is coupled to the input of transfer function circuit 28, while the output circuit 29 of transfer function 28 is coupled to the input of bandpass filter 32. The output circuit 33 of band-pass filter 32 is then fed into the input circuits 34 and 35 of phase detectors #1 and #2, respectively, herein designated 36 and 37. Phase detector #1 further has a second input circuit 38 coupled to the output lead 12 of sine wave source 11, while the second input circuit 39 of phase detector 37 is coupled to the second output lead 13 of sine wave source 11. The output circuit 42 of phase detector #1 is coupled to low-pass filter #1, herein designated 43, and the output circuit 44 of phase detector 37 is coupled to low-pass filter #2, herein designated 45. The low-pass filters 43 and 45 have output leads 65 and 66, respectively.

Figure 3:
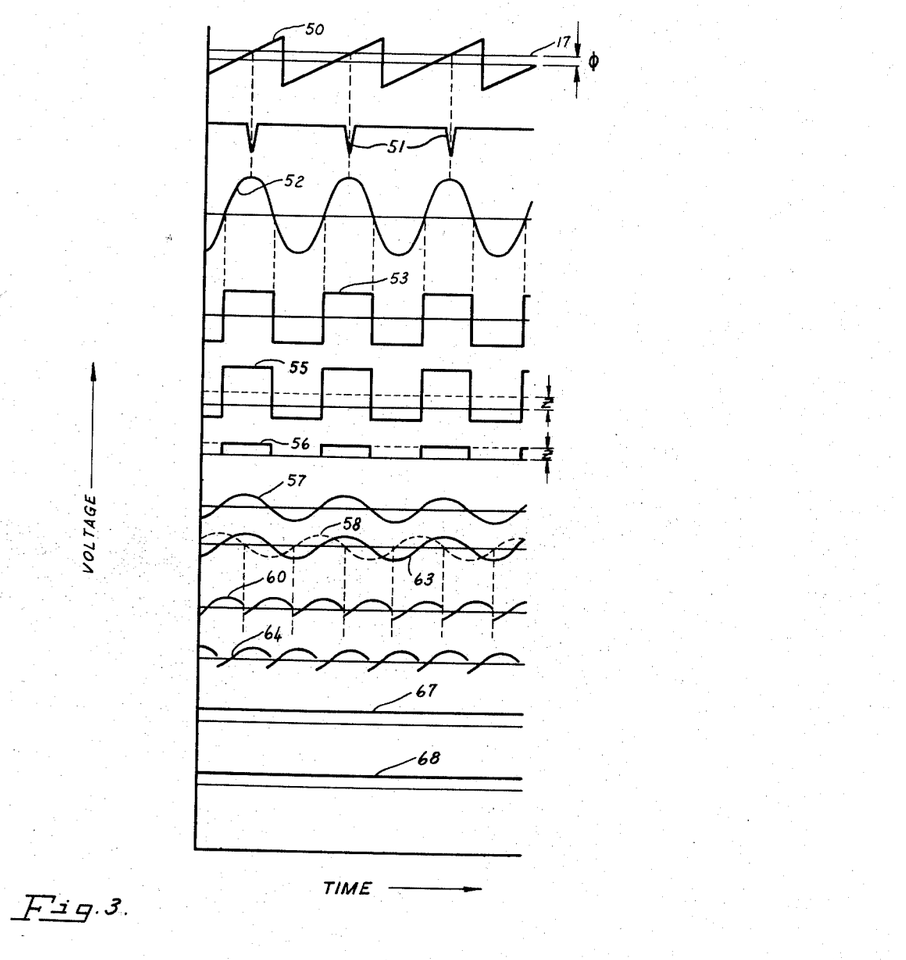
Fig. 3 is a graph showing the voltages as a function of time appearing at certain critical points of the circuit of Fig. 1.

The operation of the circuit of Fig. 1 will now be explained with reference to the curves of the graph shown in Fig. 3. Saw tooth output signal 50 is produced by saw tooth generator 14 at lead 16. Voltage coincidence circuit 15 is so designed as to produce an output signal at lead 18 in the form of a pulse 51 whenever saw tooth signal 50 has its voltage amplitude coincident with the voltage $\phi$ of direct-current input signal 17. These pulses 51 are then fed into tuned circuit or sine wave signal source 19 which produces at its output lead 22 sine wave voltage 52 whose frequency is equal to that of the frequency of pulses 51. Sine wave 52 is then fed into amplifier and clipper 23 through lead 22, resulting in an output square wave signal 53 being produced at output lead 24. Adding circuit 25 will produce square wave signal 55 which is the sum of direct-current voltage Z and square wave signal 53 at output circuit 27. Signal 55, which is square wave signal 53 displaced by Z volts in the positive direction, will then be fed into transfer function circuit 28 which circuit will produce output signal 56 at output lead 29. Signal 56 will then pass through band-pass filter 32 which will transform signal 56 into sine wave 57 at the output lead 33.

Sine wave signal 57 will then be fed into phase detectors #1 and #2 through input leads 34 and 35, respectively. Phase detector 36 will, upon receipt of sine wave 57 and the sine wave produced by sine wave source 11, on its output lead 12, which is shown as signal 58 in Fig. 3, produce output signal 60 at its output lead 42. Likewise phase detector 37 will, upon receipt of sine wave 57 at its input lead 35, together with sine wave 63 obtained from output lead 13 of sine wave source 11, result in output signal 64 at output lead 44. Low-pass filter #1, designated 43, will then smooth signal 60 to produce a voltage 67 at its output lead 65, which will be the product of $Z \sin \theta$. Likewise low-pass filter #2, designated 45, will smooth output signal 64 to produce a signal 68 which is the product of $Z \cos \theta$. Various of the circuits discussed in Fig. 1 which are not considered obvious to those skilled in the art will hereinafter be explained with reference to Figs. 5a through 5d.

A second embodiment of the present invention will now be explained with reference to the block diagram of Fig. 2. Sine wave generator 75 produces two different output signals at three output circuits or leads 76, 77, and 78. At leads 77 and 78 there is produced a sine wave signal of zero phase, while at output lead 76 there there is produced a sine wave which is 90° out-of-phase with the signals produced at leads 77 and 78. Square wave generator 80 has two output circuits 81 and 82, which output circuits are coupled to amplitude modulators #1 and #2, herein designated 83 and 84, respectively. Modulator 83 has another input circuit 85 to receive a direct-current input signal proportional to X. Modulator 84 also has a second input circuit 86 to receive a direct-current voltage proportional to Y. The output circuits 87 and 88 of modulators 84 and 85, respectively, are fed into adding circuit 92, which, in turn, has its output circuit 93 coupled to the input of low-pass filter #1 designated 94. Output circuit 95 of low-pass filter 94 is fed into half-wave rectifier 96 and amplifier and clipper circuit 97. Output circuit 98 of rectifier 96 is then coupled to the input of low pass filter #2 herein designated as 99. Output circuit 102 of amplifier and clipper 97 is coupled to the input of adding circuit 103. Adding circuit 103 has an additional input circuit 104 which is coupled to a source of voltage having a voltage representing W. The output circuit 105 of adding circuit 103 is coupled to the input of transfer function circuit 106 which, in turn, has its output circuit 107 coupled to the input circuit of band-pass filter 108. The output circuit 109 of band-pass filter 108 is, in turn, coupled to the input circuits 110 and 111 of phase detectors #1 and #2 herein designated 115 and 116, respectively. Sine wave generator 75 likewise has its output leads 77 and 76 connected to the inputs of phase detectors 115 and 116. Phase detector 115 has its output circuit 117 coupled to the input of low-pass filter #3, herein designated 118, while the output circuit 119 of phase detector 116 is coupled to the input of low pass filter #4 herein designated 120.

Figure 4:
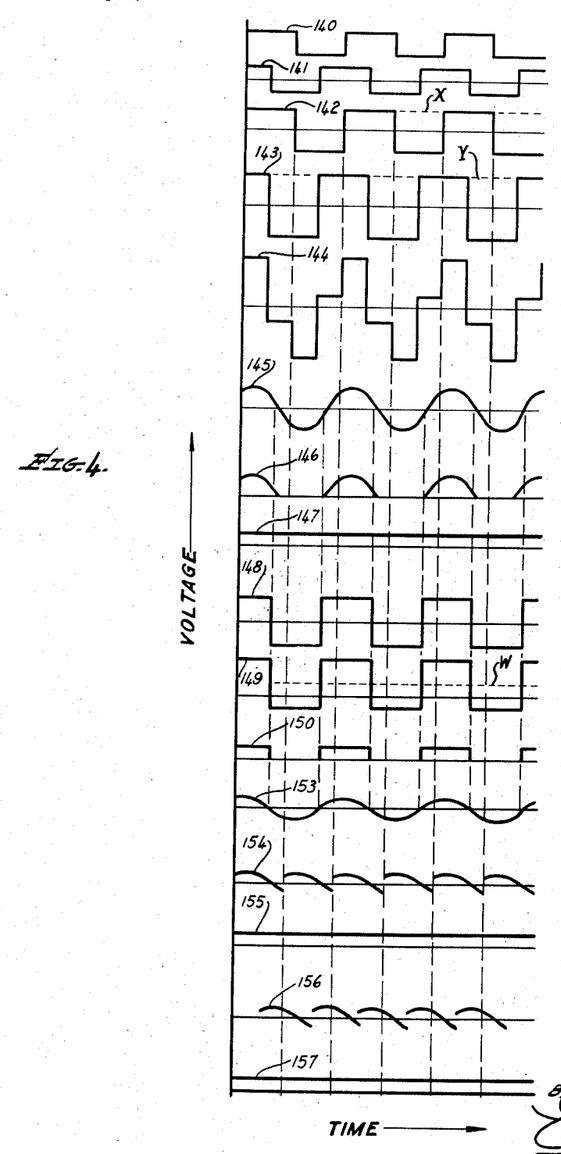
Fig. 4 is a graph showing the voltages as a function of time appearing at certain critical points of the circuit of Fig. 2.

Reference will now be made to Fig. 4 in order to explain the operation of the circuit of Fig. 2 by relating thereto the various curves of the graph shown in Fig. 4. Square wave output signal 140 is produced by square wave generator 80 at output circuit 81 while square wave signal 141, which is 90 degrees out of phase with square wave signal 140, is produced by square wave generator 80 at output circuit 82. Amplitude modulator #1, designated 83, will produce an output signal 142 at output circuit 88 which is a function of direct-current input signal X and square wave signal 140. Likewise an output signal 143 is produced at the output circuit 87 of modulator #2, designated 84, which is a function of input signal 141 and the direct-current input signal proportional to Y. Signals 142 and 143 are then fed into adding circuit 92 through leads 87 and 88 to produce output signal 144 at output lead 93, which is the sum of signals 142 and 143.

Low-pass filter 94 in response to signal 144 will produce a sine wave signal 145 at its output lead 95 which sine wave signal is then fed into half-wave rectifier 96 and amplifier and clipper 97 simultaneously. Half-wave rectifier 96 in response to the sine wave signal 145 will provide output signal 146 at output circuit 98. Low-pass filter #2, designated 99, will then produce a direct-current signal proportional to the square root of $(X^2+Y^2)$ in response to signal 146 at its output circuit, this output signal being designated 147. At the same time amplifier and clipper circuit 97 will in response to sine wave 145 produce a square wave signal 148 at output lead 102. Adding circuit 103 will then upon the simultaneous receipt of a voltage proportional to direct-current voltage W and square wave signal 148 produce at output lead 105 square wave signal 149. Transfer function circuit 106 upon receipt of square wave signal 149 will produce at its output lead 107 a voltage shown at 150, the amplitude of which is proportional to W. Band-pass filter 108 will then produce a sine wave signal 153 at its output lead 109 in response to signal 150. Phase detector #1, designated 115, upon the simultaneous receipt of the zero phase sine wave signal produced by sine wave generator 75 at output lead 77 and sine wave signal 153 will produce at its output lead 117 output signal 154. Low-pass filter #3, designated 118, will then upon receipt of signal 154 produce direct-current output signal 155 which is representative of $W \sin \phi$.

Phase detector #2, designated 116 upon the simultaneous receipt of the 90° out-of-phase sine wave signal produced by sine wave generator 75 at its output lead 76 and sine wave signal 153 will produce at its output lead 119 output signal 156. Low-pass filter #4, designated 120, will then upon receipt of signal 156 produce direct-current output signal 157 which is representative of $W \cos \phi$.

Figure 5A:
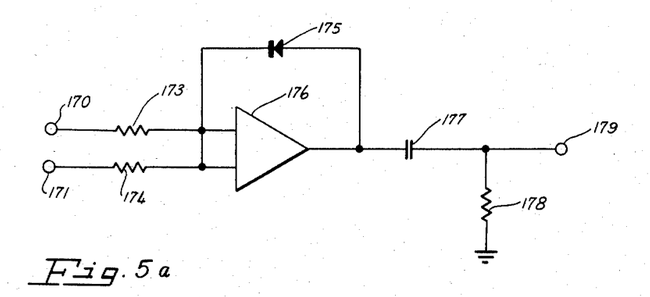
Figs. 5a through 5d are schematic circuit diagrams of some of the circuits included in the block diagram of Fig. 1.

Attention is now directed to Figs. 5a through 5d wherein the nonobvious circuits of the system of Fig. 1 are shown. In Fig. 5a there is shown a representative circuit which will perform the function required of voltage coincidence circuit 15. The input circuit has resistors in 173 and 174 at the input terminals 170 and 171. Diode 175 is connected across amplifier 176 to the other sides of resistors 173 and 174. The output circuit has a resistive-capacitive circuit before output 179 comprising a capacitor 177 and resistor 178 which is returned to ground. Input terminals 170 and 171 receive direct-current voltage 17 and sawtooth voltage 50. Each time the sawtooth voltage 50 begins to exceed the direct-current voltage 17 while going in a positive direction a pulse 51 will be produced. This occurs because whenever the direct-current level of sawtooth wave 50 exceeds voltage 17, diode 175 becomes backbiased acting like an open circuit, thus removing the negative feedback of amplifier 176 causing a negative pulse 51 to be produced at output terminal 179. Capacitor 177 and resistor 178 merely provide alternating-current coupling for circuit 15 to tuned circuit 19.

Figure 5B:
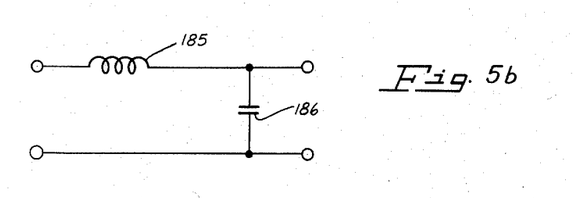

In Fig. 5b there is shown a typical ringing or tuned circuit. The values of inductor 185 and capacitor 186 are chosen so that the tuned or resonant frequency thereof will produce a sine wave output each time a positive pulse 55 is received to excite the ringing circuit.

Figure 5C:
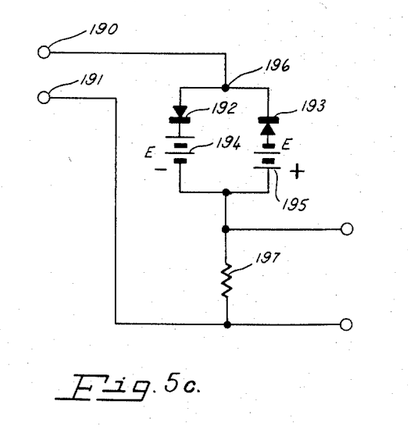
Figure 5D:
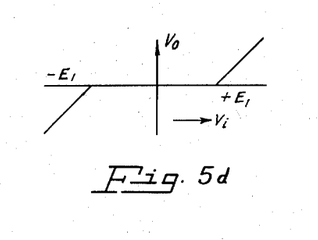

Fig. 5c is a circuit diagram showing how the transfer function circuit 28 might be arranged. Input terminals 190 and 191 receive square wave signal 55 and in accordance with the transfer function as shown by the graph of Fig. 5d will produce output signal 56 whose amplitude is proportional to Z. As can be seen in Fig. 3, signal 55 is the same as square wave signal 53 except that it is displaced by an amount equal to Z.

The transfer function circuit shown in Fig. 5c has two diodes 192 and 193 each with an associated battery 194 and 195, respectively. This entire circuit is connected across the input terminals 190 and 191 at point 196 above and through output resistor 197 below. Each of diodes 192 and 193 of the Fig. 5c circuit are backbiased by a voltage equal to E by batteries 194 and 195. Whenever the voltage at point 196 exceeds +E volts, diode 192 will conduct producing a voltage proportional to Z across resistor 197. On the other hand, whenever the voltage is at or below 0 volt, but less in magnitude than E volts, diode 193 will remain backbiased so that no current will flow through resistor 197.

Figure 2:
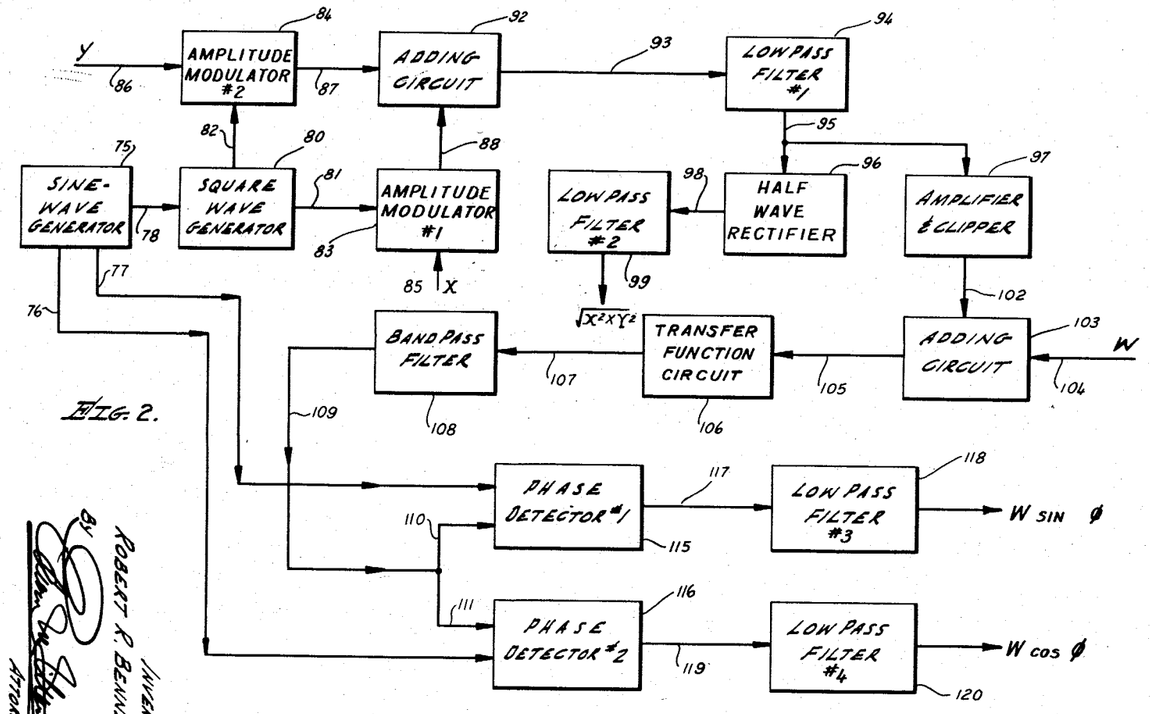
Fig. 2 is a block diagram of another embodiment of the present invention.

In Figs. 6a through 6d are shown the nonobvious circuits included in the Fig. 2 embodiment of the present invention. The circuit of Fig. 6a acts as a band-pass filter such as filter 108, inductor 200 and capacitor 201 being so chosen as to be in series resonance while inductor 202 and capacitor 203 are in parallel resonance at predetermined frequencies, a typical arrangement for a band-pass filter.

Figures 6A, 6B:
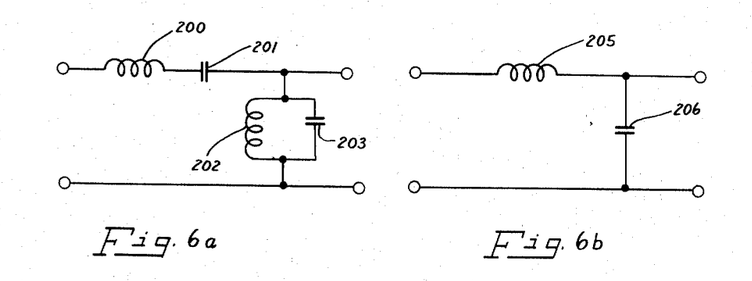
Figs. 6a through 6d are schematic circuit diagrams of some of the circuits included in the block diagram of Fig. 2.

The Fig. 6b circuit is similar to that of Fig. 5b, but the circuit parameters, namely, inductor 205 and capacitor 206 have their values chosen so that it functions as a low-pass filter such as filters 94, 99, 118 and 120.

Figure 6C:
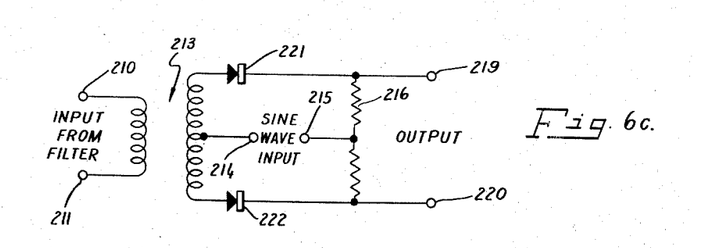

The circuit of Fig. 6c represents a phase detector which may be used as phase detector #1 and #2 of Fig. 2. The signal produced by the band-pass filter is received at input terminals 210 and 211 which are connected to the primary winding of transformer 213, input terminals 214 and 215 simultaneously receiving the sine wave input signal. The Fig. 6c circuit is representative of all four phase detector circuits, i.e., 26 and 27 of Fig. 1 and 115 and 116 of Fig. 2. In the Fig. 1 circuit for example, the phase detector #1 would have input terminals 210 and 211 connected to band-pass filter 32 while the other input terminals 214 and 215 are connected to sine wave source 11 at input 33. Diodes 221 and 222 are provided across the output of transformer 213 in order to produce a sort of half-wave rectification. Of course the sine wave signal applied to terminals 214 and 215 will be either a sine or cosine signal as explained hereinbefore. The input terminals 214 and 215 are connected to the center tap of the secondary winding of transformer 213 and the center tap of output resistor 216. Finally, the output is taken across resistor 216 at output terminals 219, 220.

Whenever the sine wave input signal is applied to input terminals 214 and 215, there is an instant of time at which terminal 214 is at a positive potential. Accordingly, diodes 221 and 222 will conduct producing a sine wave output signal across resistor 216 at output terminals 219 and 220. Now if we consider the other sine or cosine signal being applied simultaneously to the primary winding of transformer 213 at input terminals 210 and 211, the signal produced at output terminals 219 and 220 will, depending upon the relative amplitudes of the input signals, appear as one of the output signals 60 or 64 of Fig. 3 or signals 154 or 156 of Fig. 4.

Figure 6D:
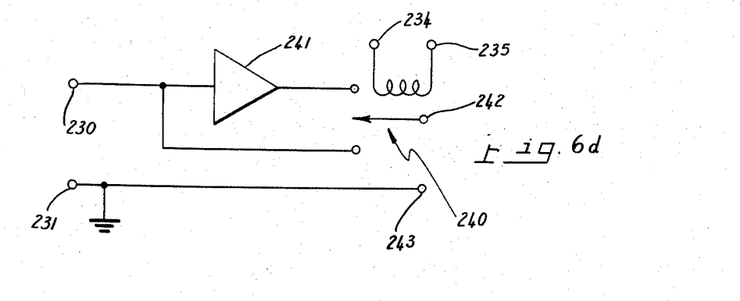

In Fig. 6d there is shown one possible embodiment of either of the two amplitude modulators 83 and 84 of Fig. 2. Two inputs 230, 231 and 234, 235 are provided in this circuit. Unity gain amplifier 241 is connected between the input circuits and relay 242 is connected across input terminals 234 and 235. The direct-current input signal is presented across input terminals 230 and 231 while the square wave input signal is applied to the input terminals 234 and 235 of relay 240. Unity gain amplifier 241 merely serves to reverse the polarity of the square wave signal. The output square wave signal will then be produced at output terminals 242 and 243.

There has thus been described a new electronic resolver whose inherent speed and reliability is greater than that heretofore known to the art.

What is claimed as new is:

1. A circuit for producing a direct-current output signal representative of the product of an applied direct-current input signal and a function of the phase angle of a sine wave input signal relative to a reference sine wave, said circuit comprising: a sine wave reference source for developing a reference sine wave; a sine wave signal source for developing a sine wave input signal; first means coupled to said signal source for receiving said sine wave input signal and for developing a substantially square-topped output signal in response thereto; an adder circuit coupled to said first means for receiving and adding the square-topped output signal from said first means and an applied direct-current signal; a transfer function circuit coupled to said adder circuit for producing a transfer signal representative of the output of said adder circuit; second means coupled to said transfer function circuit for receiving the transfer signal from said transfer function circuit and converting said transfer signal into a sine wave output signal; phase detector means coupled to said second means and said sine wave reference source; and third means coupled to said phase detector for producing a direct-current output signal in response to the output signal of said phase detector, the value of which is representative of a function of the product of the applied direct-current input signal and a function of the phase relation between said sine wave input signal and said reference sine wave.

2. An electronic circuit for producing a direct-current output signal representative of the product of an applied direct-current input signal and a function of the phase angle of a sine wave input signal relative to a reference sine wave, said circuit comprising: a sine wave reference source for developing a reference sine wave; a sine wave signal source for developing a sine wave input signal; a clipper coupled to said signal source for receiving said sine wave input signal and for developing a substantially square-topped output signal; an adder circuit coupled to said clipper for receiving and adding the square-topped output signal from said clipper and an applied direct-current signal; a transfer function circuit coupled to said adder circuit for producing a transfer signal representative of the output of said adder circuit; a band-pass filter coupled to said transfer function circuit for receiving the transfer signal from said transfer function circuit and converting said transfer signal into a sine wave output signal; phase detector means coupled to said band-pass filter and said sine wave reference source; and a low pass filter coupled to said phase detector for producing a direct-current output signal, the value of which is representative of a function of the product of the applied direct-current input signal and a function of the phase relation between said sine wave input signal and said reference sine wave.

3. An electronic circuit for producing a direct-current output signal representative of the product of an applied direct-current input signal and a function of the phase angle of a sine wave input signal relative to a reference sine wave, said circuit comprising: a sine wave reference source for developing a reference sine wave; a cosine wave reference source for developing a reference cosine wave; a sine wave signal source for developing a sine wave input signal; a clipper coupled to said signal source for receiving said sine wave input signal and for developing a substantially square-topped output signal; an adder circuit coupled to said clipper for receiving and adding the square-topped output signal from said clipper and an applied direct-current signal; a transfer function circuit coupled to said adder circuit for producing a transfer signal representative of the output of said adder circuit; a band-pass filter coupled to said transfer function circuit for receiving the transfer signal from said transfer circuit and converting said transfer signal into a sine wave output signal; first phase detector means coupled to said band-pass filter and said sine wave reference source; second phase detector means coupled to said band-pass filter and said cosine wave reference source; a first low pass filter coupled to said first phase detector for producing a first direct-current output signal, the value of which is representative of a function of the product of the applied direct-current input signal and a function of the phase relation between said sine wave input signal and said reference sine wave; and a second low pass filter coupled to said second phase detector for producing a second direct-current output signal, the value of which is representative of a function of the product of the applied direct-current input signal and a function of the phase relation between said sine wave input signal and said reference cosine wave.

4. An electronic system for producing a direct-current output signal representative of the product of an applied direct-current input signal and a function of the phase angle of a sine wave input signal relative to a reference sine wave, said circuit comprising: a sine wave reference source for developing a reference sine wave; a cosine wave reference source for developing a reference cosine wave; a sawtooth generator coupled to said sine wave reference source for producing a sawtooth signal; a voltage coincidence circuit coupled to said sawtooth generator for receiving a first applied direct-current signal and said sawtooth signal and for producing a series of pulses, said pulses occurring periodically whenever said second applied direct-current signal and said sawtooth signal are of the same potential; a tuned circuit coupled to said voltage coincidence circuit for producing a sine wave input signal of the same frequency as that of said pulses; a clipper coupled to said tuned circuit for receiving said sine wave input signal and for developing a substantially square-topped output signal; an adder circuit coupled to said clipper for receiving and adding the square-topped output signal from said clipper and a second applied direct-current signal; a transfer function circuit coupled to said adder circuit for producing a transfer signal representative of the output of said adder circuit; a band-pass filter coupled to said transfer function circuit for receiving the transfer signal from said transfer circuit and converting said transfer signal into a sine wave output signal; first phase detector means coupled to said band-pass filter and said sine wave reference source; second phase detector means coupled to said band-pass filter and said cosine wave reference source; a first low pass filter coupled to said first phase detector for producing a first direct-current output signal, the value of which is representative of a function of the product of the second applied direct-current input signal and a function of the phase relation between said sine wave input signal and said reference sine wave; and a second low pass filter coupled to said second phase detector for producing a second direct-current output signal, the value of which is representative of a function of the product of the second applied direct-current input signal and a function of the phase relation between said sine wave input signal and said reference cosine wave.

5. An electronic system for producing a sine wave output signal representative of the product of an applied direct-current input signal and a function of another applied direct-current signal, said system comprising: a sine wave reference source for developing a reference sine wave; a sawtooth generator coupled to said sine wave reference source for producing a sine wave signal; a voltage coincidence circuit coupled to said sawtooth generator for receiving a first applied direct-current signal and said sawtooth signal and for producing a series of pulses, said pulses occurring whenever said first applied direct-current signal and said sawtooth signal are of the same potential; a tuned circuit coupled to said voltage coincidence circuit for producing a sine wave input signal of the same frequency as that of said pulses; a clipper coupled to said tuned circuit and for developing a substantially square-topped output signal; an adder circuit coupled to said clipper for receiving and adding the square-topped output signal from said clipper and a second applied direct-current signal; a transfer function circuit coupled to said adder circuit for producing a transfer signal representative of the output of said adder circuit; and a band-pass filter coupled to said transfer function circuit for receiving the transfer signal from said transfer circuit and converting said transfer signal into a sine wave output signal.

6. An electronic system for producing a direct-current output signal representative of the product of a first applied direct-current input signal and a function of a second applied direct-current input signal, said system comprising: a sine wave reference source for developing a reference sine wave; a sawtooth generator coupled to said sine wave reference source for producing a sawtooth signal; a voltage coincidence circuit coupled to said sawtooth generator for receiving a first applied direct-current signal and said sawtooth signal and for producing a series of pulses, said pulses occurring whenever said first applied direct-current signal and said sawtooth signal are of the same potential; a tuned circuit coupled to said voltage coincidence circuit for producing a sine wave input signal of the same frequency as that of said pulses; a clipper coupled to said tuned circuit for receiving said sine wave input signal and for developing a substantially square-topped output signal; an adder circuit coupled to said clipper for receiving and adding the square-topped output signal from said clipper and a second applied direct-current signal; a transfer function circuit coupled to said adder circuit for producing a transfer signal representative of the output of said adder circuit; a band-pass filter coupled to said transfer function circuit for receiving the transfer signal from said transfer circuit and converting said transfer signal into a sine wave output signal; a phase detector coupled to said band-pass filter and said sine wave reference source for producing a signal representative of said reference sine wave and said sine wave output signal; and a low pass filter coupled to said phase detector for producing a direct-current output signal, the value of which is representative of a function of the product of said first applied direct-current signal and a function of said second applied direct-current signal.

7. An electronic system for producing direct-current output signals representative of the product of a first applied direct-current input signal and a function of a second and a third applied direct-current input signal, said system comprising: a sine wave generator for producing a first sine wave reference signal and a second sine wave reference signal 90° out of phase with said first sine wave reference signal; a square wave generator coupled to said sine wave generator for producing a first square wave reference signal; a first amplitude modulator coupled to said square wave generator for producing a first square wave output signal representative of the sum of said first square wave reference signal and a first applied direct-current input signal; a second amplitude modulator coupled to said square wave generator for producing a second square wave output signal representive of the sum of said second square wave reference signal and a second applied direct-current signal; an added circuit coupled to said first and second modulators for producing an output signal representative of the sum of the output signals produced by said modulators; a first low pass filter coupled to said added circuit for producing a sine wave representative of the output signal produced by said adder circuit; a half wave rectifier coupled to said first low pass filter for rectifying said sine wave signal received from said first low pass filter; a second low pass filter coupled to said rectifier for receiving the output signal produced by said rectifier and producing a first direct-current output signal representative of a function of the first and second aplied direct-current input signals; an amplifier and clipper coupled to said first low pass filter for producing a third square wave signal representative of the sine wave signal produced by said low pass filter; a second adder circuit coupled to said amplifier and clipper for producing a fourth square wave signal representative of the sum of said third square wave signal and a third applied direct-current input signal; a transfer function circuit coupled to said adder circuit for receiving said fourth square wave signal and producing a transfer signal representative of the output of said adder circuit; a band-pass filter coupled to said transfer function circuit for receiving the transfer signal and converting said transfer signal into a sine wave output signal; a first phase detector coupled to said band-pass filter and said sine wave generator for producing a signal representative of said sine wave output signal and said first sine wave reference signal; a second phase detector coupled to said band-pass filter and said sine wave generator for producing a signal representative of said sine wave output signal and said second sine wave reference signal; a third low pass filter coupled to said first phase detector for producing a second direct-current output signal representative of the product of said third applied direct-current input signal and a function of said first and second applied direct-current input signals; and a fourth low pass filter coupled to said second phase detector for producing a third direct-current output signal representative of the product of said third applied direct-current input signal and a function of said first and second applied direct-current input signals.

References Cited in the file of this patent

UNITED STATES PATENTS

| | | |
|---|---|---|
| 2,581,438 | Palmer | Jan. 8, 1952 |
| 2,610,789 | Hales | Sept. 16, 1952 |
| 2,697,190 | Andersson | Dec. 14, 1954 |
| 2,733,004 | Richardson | Jan. 31, 1956 |
| 2,781,169 | Donan et al. | Feb. 12, 1957 |
| 2,870,960 | Richardson | Jan. 27, 1959 |
| 2,873,066 | McKenney | Feb. 10, 1959 |

FOREIGN PATENTS

| | | |
|---|---|---|
| 815,559 | Germany | Nov. 19, 1951 |

OTHER REFERENCES

Amorosi et al.: A Direct Reading Phasemeter etc.; AIEE Miscellaneous Paper 51—270 (May 1951), Title page, 19 pp. of text and 4 pp. of figures (pages 6 to 12, and the two pages containing respectively Fig. 3 and Fig. 9 particularly relied upon).